United States Patent
Hill et al.

(10) Patent No.: US 8,990,689 B2
(45) Date of Patent: *Mar. 24, 2015

(54) TRAINING FOR SUBSTITUTING TOUCH GESTURES FOR GUI OR HARDWARE KEYS TO CONTROL AUDIO VIDEO PLAY

(75) Inventors: Seth Hill, La Mesa, CA (US); Travis Baurmann, San Diego, CA (US)

(73) Assignee: Sony Corporation, Tokyo (JP)

( * ) Notice: Subject to any disclaimer, the term of this patent is extended or adjusted under 35 U.S.C. 154(b) by 998 days.

This patent is subject to a terminal disclaimer.

(21) Appl. No.: 13/076,650

(22) Filed: Mar. 31, 2011

(65) Prior Publication Data
US 2012/0200574 A1 Aug. 9, 2012

Related U.S. Application Data

(60) Provisional application No. 61/439,294, filed on Feb. 3, 2011.

(51) Int. Cl.
G06F 3/048 (2013.01)
G06F 9/44 (2006.01)

(52) U.S. Cl.
CPC ............. *G06F 9/4446* (2013.01); *G06F 3/048* (2013.01)
USPC .......................................... 715/709; 715/719

(58) Field of Classification Search
CPC .................... G06F 3/04895; G06F 3/04812
USPC ......... 345/473–475; 715/719–721, 863, 723, 715/726, 702, 717, 722, 724–725, 864; 348/564
See application file for complete search history.

(56) References Cited

U.S. PATENT DOCUMENTS

| | | | |
|---|---|---|---|
| 7,013,323 B1* | 3/2006 | Thomas et al. | 709/203 |
| 8,330,584 B1 | 12/2012 | Pfanstiehl | |
| 2002/0118131 A1 | 8/2002 | Yates et al. | |
| 2002/0152216 A1* | 10/2002 | Bouthors | 707/10 |
| 2003/0035075 A1 | 2/2003 | Butler et al. | |
| 2005/0039134 A1 | 2/2005 | Wiggeshoff et al. | |
| 2008/0036773 A1 | 2/2008 | Bae | |
| 2009/0140064 A1 | 6/2009 | Schultz et al. | |
| 2009/0265670 A1 | 10/2009 | Kim et al. | |
| 2009/0319894 A1* | 12/2009 | Markiewicz et al. | 715/702 |
| 2010/0180305 A1 | 7/2010 | Migos | |
| 2010/0272414 A1 | 10/2010 | Reneris | |
| 2011/0007008 A1 | 1/2011 | Algreatly | |
| 2011/0022292 A1 | 1/2011 | Shen et al. | |

(Continued)

OTHER PUBLICATIONS

Seth Hill, Travis Baurmann, Scott Szabo, Guru Balasubramanian, "Substitute Touch Gesture for GUI or Hardware Keys to Control Audio Video Play", file history of related pending application U.S. Appl. No. 13/076,854.

(Continued)

*Primary Examiner* — Steven Sax
(74) *Attorney, Agent, or Firm* — John L. Rogitz

(57) ABSTRACT

A user can toggle between GUI input and touch screen input with the GUI hidden using touch gestures correlated to respective hidden GUI elements and, thus, to respective commands for a TV and/or disk player sending AV data thereto. When in the GUI input mode, an animated hand can be presented on the display moving through the touch gesture corresponding to a selected GUI element to train the user on which touch gestures correspond to which GUI elements (and, thus, to respective commands for a TV and/or disk player sending AV data thereto.)

16 Claims, 5 Drawing Sheets

(56) References Cited

U.S. PATENT DOCUMENTS

| | | |
|---|---|---|
| 2011/0041461 A1 | 2/2011 | Nelson |
| 2011/0047461 A1 | 2/2011 | Bargmann |
| 2011/0074830 A1 | 3/2011 | Rapp et al. |
| 2011/0090407 A1 | 4/2011 | Friedman |
| 2011/0214162 A1 | 9/2011 | Brakensiek et al. |
| 2011/0246908 A1 | 10/2011 | Akram et al. |
| 2012/0062471 A1 | 3/2012 | Pulidis et al. |
| 2012/0109455 A1 | 5/2012 | Newman et al. |
| 2012/0120257 A1* | 5/2012 | Corn et al. ............... 348/207.1 |
| 2012/0133580 A1* | 5/2012 | Kirby et al. ............... 345/156 |
| 2012/0159327 A1* | 6/2012 | Law et al. ............... 715/716 |
| 2012/0169622 A1 | 7/2012 | Grossman et al. |
| 2012/0179967 A1 | 7/2012 | Hayes |
| 2012/0179970 A1 | 7/2012 | Hayes |
| 2012/0200574 A1 | 8/2012 | Hill et al. |
| 2012/0260285 A1* | 10/2012 | Young et al. ............... 725/37 |
| 2013/0285909 A1* | 10/2013 | Patel et al. ............... 345/158 |
| 2013/0332829 A1* | 12/2013 | Costanzo et al. ............... 715/716 |

OTHER PUBLICATIONS

David Young, Steven Friedlander, Sabrina Tai-Chen Yeh, "Next Generation User Interface for Audio Video Display Such as TV", file history of related pending U.S. Appl. No. 13/961,113, filed Aug. 7, 2013.

Seth Hill, Travis Baurmann, Scott Szabo, Guru Balasubramanian, "Substitute Touch Gesture for GUI or Hardware Keys to Control Audio Video Play", related pending U.S. Appl. No. 13/076,854 final office action dated Oct. 9, 2014.

Seth Hill, Travis Baurmann, Scott Szabo, Guru Balasubramanian, "Substitute Touch Gesture for GUI or Hardware Keys to Control Audio Video Play", related pending U.S. Appl. No. 13/076,854 applicants response to final office action filed Nov. 17, 2014.

* cited by examiner

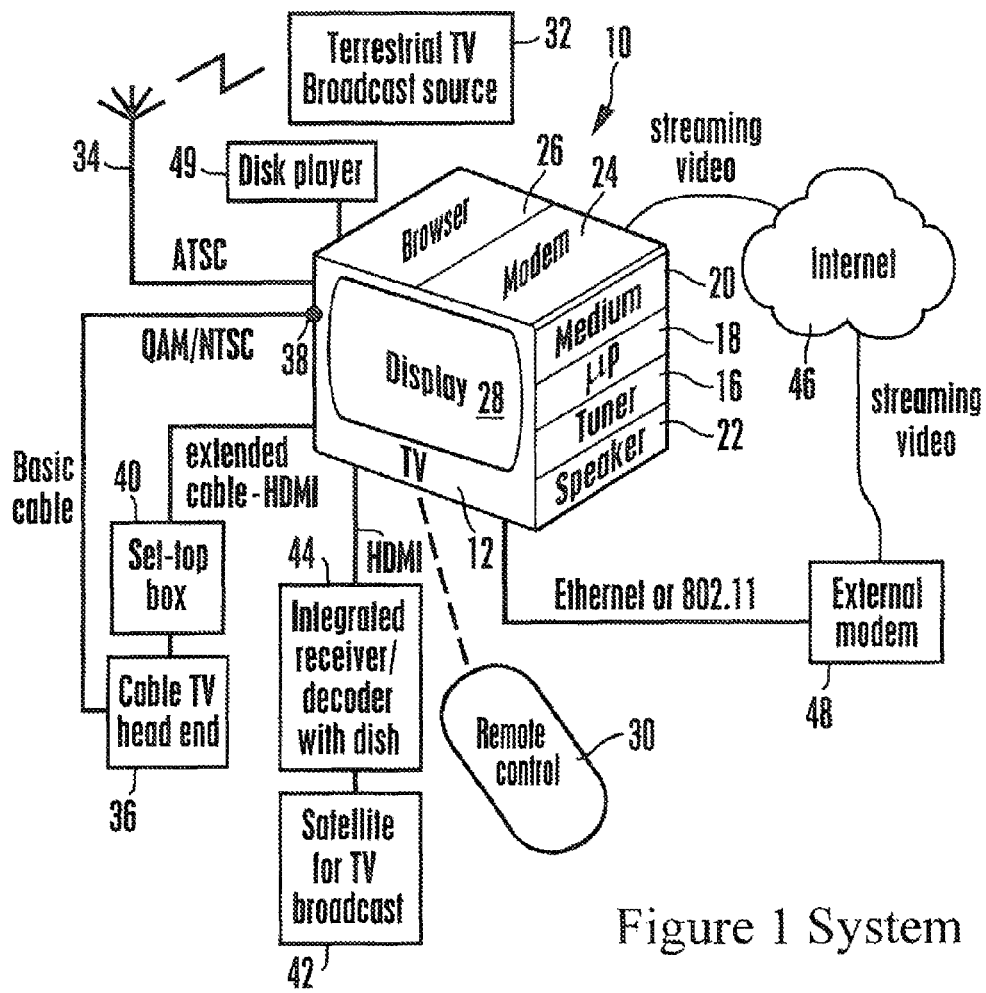
Figure 1 System
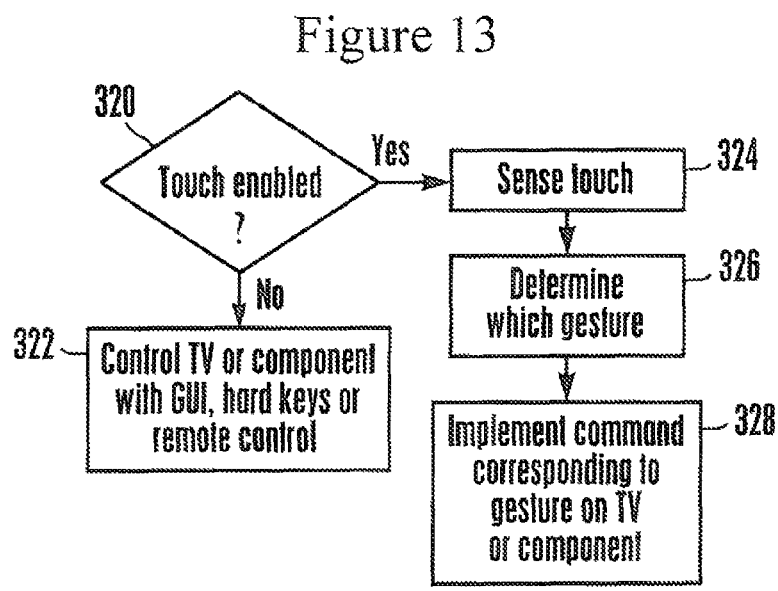
Figure 13

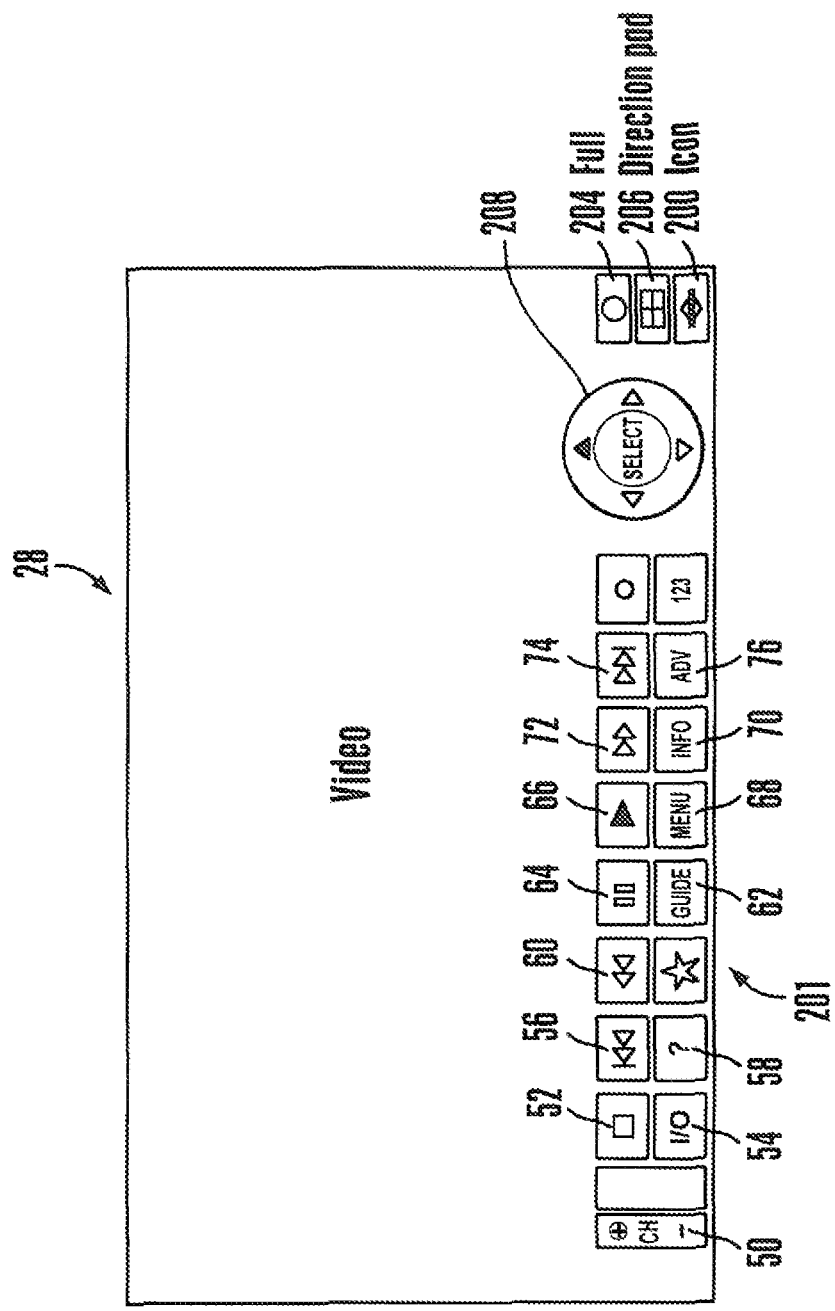

Iconified

D-pad only 10 key pop-up

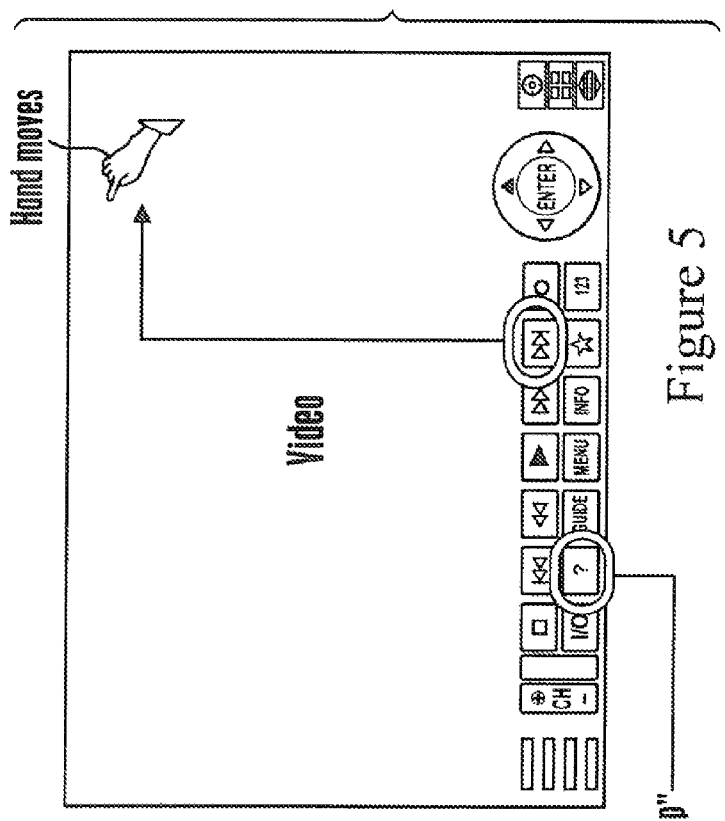
Figure 5
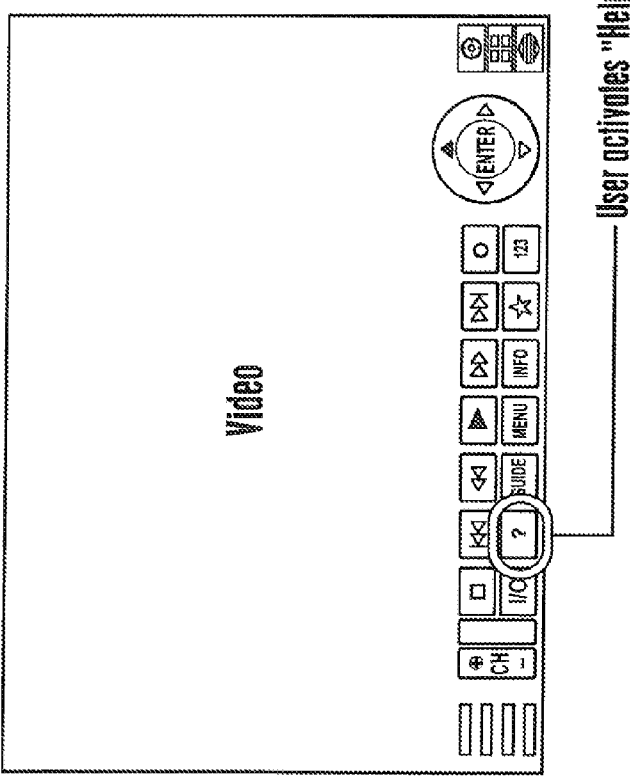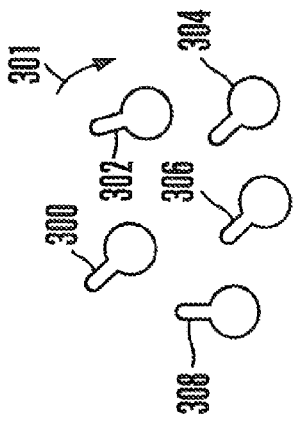
Figure 6

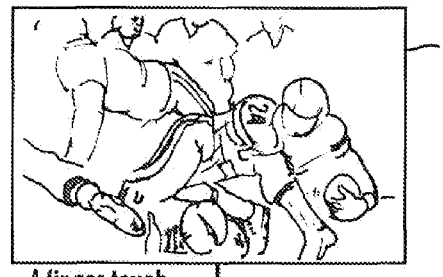
Figure 8
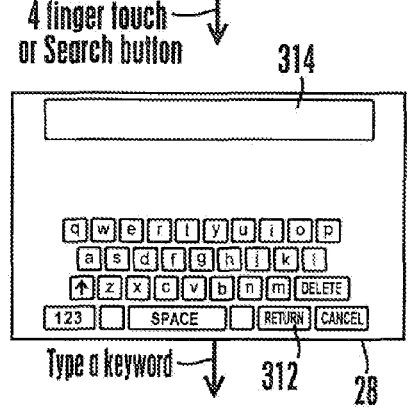
Figure 9
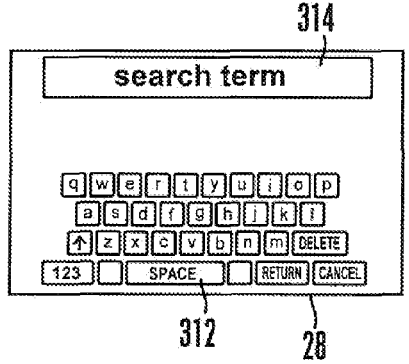
Figure 10
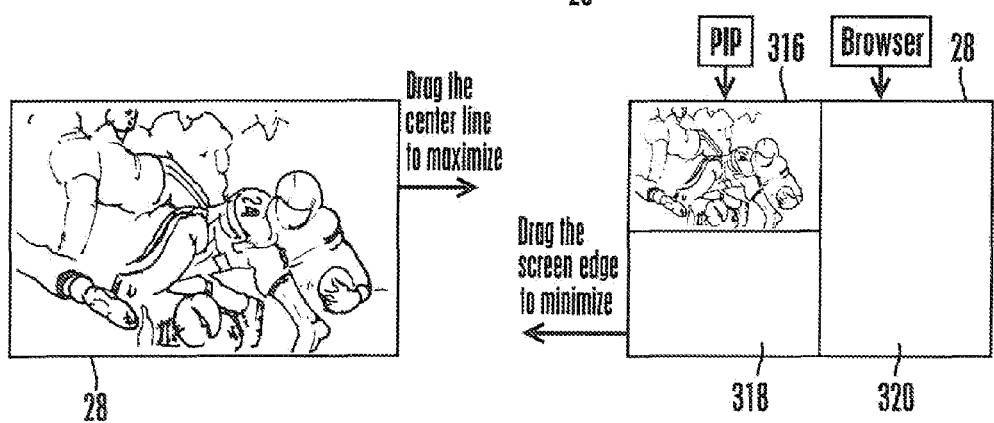
Figure 11                    Figure 12

TRAINING FOR SUBSTITUTING TOUCH GESTURES FOR GUI OR HARDWARE KEYS TO CONTROL AUDIO VIDEO PLAY

This claims priority from U.S. provisional application Ser. No. 61/439,294, filed Feb. 3, 2011.

FIELD OF THE INVENTION

The present application relates generally to substituting touch gestures on, e.g., a touch screen of an audio video playback device for an on screen graphical user interface (GUI) or hardware keys on a remote control (RC).

BACKGROUND OF THE INVENTION

Televisions and other audio video (AV) devices typically are controlled using hardware keys on the device or an associated remote control (RC) or by using a RC to wirelessly select elements from a graphical user interface presented on the display of the device. As understood herein, such methods, while effective, can require somewhat cumbersome manipulation of hardware keys or GUI selector devices.

SUMMARY OF THE INVENTION

Accordingly, a method for training a user on which touches on a touch screen display of an audio video (AV) device accomplish which respective commands includes presenting on screen animations of a human hand on the display making various touch gestures. The method also includes overlaying the human hand onto video being presented on the display that depict respective gestures in relation to their respective function. The animated hand moves on screen through a gesture responsive to a corresponding GUI button or RC function having been invoked by the user.

For example, a user selecting a rewind button from an onscreen GUI on the display causes an animated hand to appear on the display and to move through a touch gesture corresponding to rewind. The gesture may be a circle. The user can select to turn animations of touch gestures on and off by toggling a GUI button.

Other touch examples with corresponding command functions include a spiral, a stationary press, and a vertical or horizontal linear swipe across at least a portion of the screen.

In another aspect, a consumer electronics (CE) device includes a processor, a touch screen display controlled by the processor, and a computer readable storage medium bearing instructions executable by the processor to present on screen animations of a human hand on the display making various touch gestures. The processor overlays the human hand onto video being presented on the display that depicts respective gestures in relation to their respective functions.

In another aspect, a method includes enabling a user to select audio video command input using touch gestures, and presenting on a video display an animation of a human hand moving through a touch gesture corresponding to an audio video command.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIGS. 2-12 show various screen shots of the display of the CE device shown in FIG. 1; and FIG. 13 is a flow chart of example logic in accordance with present principles.

DETAILED DESCRIPTION OF THE PREFERRED EMBODIMENT

Figure 3:
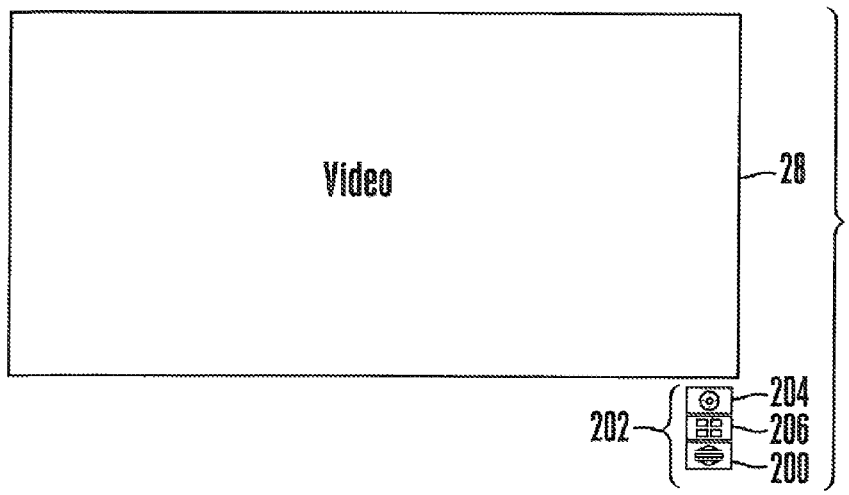

Referring initially to the non-limiting example embodiment show in FIG. 1, a system 10 includes an audio video (AV) or consumer electronics (CE) device 12 such as a TV including a TV tuner 16 communicating with a TV processor 18 accessing a tangible computer readable storage medium 20 such as disk-based or solid state storage. The TV 12 can output audio on one or more speakers 22. The TV 12 can receive streaming video from the Internet using a built-in wired or wireless modem 24 communicating with the processor 18 which may execute a software-implemented browser 26. Video is presented under control of the TV processor 18 on a TV display 28 such as but not limited to a high definition TV (HDTV) flat panel display which may be a touch screen display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the TV 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV.

Similarly, HDMI baseband signals transmitted from a satellite source 42 of TV broadcast signals received by an integrated receiver/decoder (IRD) 44 associated with a home satellite dish may be input to the TV 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the TV 12 and conveyed to the TV 12 over a wired or wireless Ethernet link and received at an RJ45 or 802.11x antenna on the TV chassis.

The viewer can control the TV 12 and sources of content therefore such as the above-described STB 40, IRD 44 (which typically include digital video recorders), a disk player 49, and the like using the RC 30. Assuming a source of video has certain trick play capability, once the TV begins a vide reception session, e.g., by receiving HDMI video from a source, images of trick play buttons on the RC 30 can be presented on the display 28 as shown in FIG. 2 so that the user can select one of the images using the RC 30's point and click capability or by manually touching the image on the touch screen display 28. Accordingly, the images presented on the touch screen display 28 can be thought of as a soft RC.

In the example shown, a channel up/down button image 50 can be selected to cause the TV 12 to tune up and down channels. A stop button image 52 can be selected to cause the source of video to stop playing the video. An on/off button image 54 can be selected to turn the TV on and off. A fast rewind button image 56 can be selected to cause the source of video to reverse video playback onscreen at a fast speed. A help button image 58 can be selected to cause a help menu to appear. A slow rewind button image 60 can be selected to cause the source of video to reverse video playback onscreen at a slow speed. A guide button image 62 can be selected to cause an electronic program guide (EPG) to be presented on the display 28. A pause button image 64 can be selected to pause video presentation on the display. A play button image 66 can be selected to play video presentation on the display at normal speed, typically thirty or thirty two frames per second. A menu button image 68 can be selected to cause a menu option guide to be presented on the display 28. An information button image 70 can be selected to cause textual information about a current video or TV program to be presented on the display 28. A fast forward button image 72 can be selected to cause the source of video to play video onscreen at a fast speed that is faster than normal speed. A fast forward button image 74 can be selected to cause the source of video to play video onscreen at a speed that is faster than the fast speed. An advance button image 76 can be present to cause video to be advanced by a chapter or scene. Additional button images may be provided and are described further below.

As set forth further below, in addition to using the soft keys shown on the display 28 in FIG. 2, a viewer can input control commands corresponding to those discussed above using touch gestures. Specific modes for entering touch gesture input are discussed below. In one example, the following gestures on the touch screen display of the TV can control TV and video playback may be as follows. "Flick" and "swipe" are used interchangeably to mean a touch that is movement of a hand, finger, or stylus against the touch screen generally along a line:
Channel UP
   2 SWIPE up
Channel DOWN
   2 SWIPE down
Guide
   2 LONG PRESS (on release)
Menu
   LONG PRESS (on release)
Play/Pause (for, e.g., Controlling the Disk Player or Other Input)
   DOUBLE TAP
4 way (courser)
   FLICK/SWIPE up/down/left/right
Select
   TAP
FF
   FLICK/SWIPE right
REW
   FLICK/SWIPE left
REC
   SPIRAL
Next
   2 SWIPE up
Previous
   2 SWIPE down
Stop
   CIRCLE In other words, a main graphical user interface (GUI) can be shown on the touch screen display as illustrated in FIG. 2, with the main GUI including first and second main GUI elements manipulable by means of a wireless remote control (RC) at least to cause respective first and second control commands to be implemented by the processor, with touch commands to control the display being disabled. At least one toggle element can be shown on the touch screen display and is selectable to hide the main first and second GUI elements and enable touch commands, with first and second touch patterns on the touch screen display being respectively correlated to the first and second control commands. The first touch pattern can be two successive swipes up the touch screen display starting nearer to a bottom edge of the display and ending nearer to a top edge of the display, and the first control command can be channel up. Or the first touch pattern can be two successive swipes down the touch screen display and the first control command can be channel down. Or the first touch pattern can be two successive long presses on the touch screen display and the first control command can be "display electronic program guide (EPG)", with a long press being continuous contact against the display for longer than a predetermined period substantially in one place on the display and with two successive long presses being two long presses separated from each other temporally by a time period, causing an EPG to be presented on the display. Yet again, the first touch pattern can be a single press against the touch screen display and the first control command can be "show menu", causing a menu to be presented on the display.

The TV may receive audio video data from a player and the processor of the TV can send the following commands to the player when the following touch gestures are sensed and touch control is enabled:
   (a) Play/Pause (for, e.g., controlling the disk player or other input)—DOUBLE TAP toggles between play and pause
   (b) 4 way (cursor)—FLICK/SWIPE up/down/left/right
   (c) Select—TAP
   (d) fast forward—FLICK/SWIPE right
   (e) rewind—FLICK/SWIPE left
   (f) record—SPIRAL
   (g) Next chapter—2 SWIPE up
   (h) Previous chapter—2 SWIPE down
   (i) Stop—CIRCLE The above touch commands can replace the need to have on screen GUI or a hardware remote to control universal TV and Blu-Ray functions.

Note that more granularity for fast forward and reverse while "pause" is selected may be provided for with the following gestures:
With video seeking available:
   Slow Mode Forward (available while paused)
   FLICK right at flick speed one initiates forward speed one
   FLICK left at any flick speed returns to pause
   Second left flick at slow speed initiates forward slow speed two (different than forward slow speed one)
   FLICK right at flick speed two initiates forward slow speed two
   FLICK left at any flick speed returns to forward speed two
   While in forward slow at any speed, a double tap returns to play at normal speed
   While in forward slow at any speed, a tap returns to pause
   Slow mode rewind (available while paused)
   FLICK left at flick speed one initiates rewind at slow speed one
   While in slow speed one, FLICK right at any flick speed returns to pause
   Second left flick at any flick speed initiates rewind at slow speed two
   FLICK left at flick speed two initiates rewind at slow speed two FLICK right at any flick speed returns to rewind at slow speed one
Second left flick at any speed—no response
While in forward slow at any speed, double tap to return to play
While in forward slow at any speed, tap to return to pause
In addition to slow motion forward at playback speeds slower than normal playback speed, fast forward (FF) at faster than normal playback speed can be initiated as follows:
FLICK right at flick speed 1 initiate FF speed 1
FLICK left at any flick speed return to normal speed
Second left flick at speed 1 initiate FF speed 2 (different than FF speed 1)
FLICK right at flick speed 2 initiate FF speed 2
FLICK left at any flick speed return to FF speed 1
Second right flick at flick speed 1 or 2 initiate FF speed 2
FLICK right at flick speed 2 initiate FF speed 3
FLICK left at any flick speed return to FF speed 2
While in FF at any speed, double tap to return to normal speed
Rewind (REW)
FLICK left at flick speed 1 initiate REW speed 1
FLICK right at any flick speed return to normal speed
Second left flick at speed 1 initiate REW speed 2
FLICK left at flick speed 2 initiate REW speed 2
FLICK right at any flick speed return to REW speed 1
Second left flick at flick speed 1 or 2 initiate REW speed 2
FLICK left at flick speed 2 initiate REW speed 3
FLICK right at any flick speed return to REW speed 2
Second left flick at any speed—no response
While in REW at any speed, double tap to return to normal speed
With video seeking unavailable:
Slow Mode Forward (available while paused)
   FLICK right at flick speed 1 initiate forward slow speed 1
   FLICK left at any flick speed to return to stop playhead
   Second left flick at any speed no response
   While in forward slow at any speed, double tap to return to play
   While in forward slow at any speed, tap to stop the playhead
Slow mode Rewind (available while paused)
   FLICK left at flick speed 1 initiate REW slow speed 1
   FLICK right at any flick speed return to stop playhead
   Second left flick at any speed no response
   While in forward slow at any speed, double tap to return to play
   While in forward slow at any speed, tap to stop the playhead
FF
   FLICK right at flick speed 1 initiate move playhead forward speed 1
   FLICK left at any flick speed stop playhead
   Second left flick at speed 1 move playhead forward speed 2
   FLICK right at flick speed 2 move playhead forward speed 2
   FLICK left at any flick speed stop playhead
   Second right flick at flick speed 1 or 2 initiate FF speed 2
   FLICK right at flick speed 2 move playhead forward speed 3
   FLICK left at any flick speed stop playhead
   While in FF at any speed, double tap to return to normal speed
   End of file, stop playhead and jump back 10 seconds
REW
   FLICK left at flick speed 1 initiate move playhead forward speed 1
   FLICK right at any flick speed stop playhead
   Second right flick at speed 1 move playhead forward speed 2
   FLICK left at flick speed 2 move playhead forward speed 2
   FLICK right at any flick speed stop playhead
   Second left flick at flick speed 1 or 2 initiate FF speed 2
   FLICK left at flick speed 2 move playhead forward speed 3
   FLICK right at any flick speed stop playhead
   While in FF at any speed, double tap to return to normal speed
End of File, Stop Playhead As stated above, swipes or flicks generally are touch patterns that more or less resemble straight lines of predetermined lengths that a user traces on the display surface without lifting his or her finger (or stylus, it being understood that the other gestures can also be made with a stylus). Circles generally are touch patterns that generally resemble a circle that a user traces without lifting his or her finger from the display surface, a long press is a touch pattern in one place on the display of greater than a predetermined period, a tap is a single touch on a single area of the display of less than a predetermined period and, if desired, longer than a threshold period, etc. A spiral touch pattern generally resembles a continuous spiral traced by the user without lifting his or her finger from the display surface.

A particular gesture may be sensed by the processor by comparing the tactile pattern sensed by the touch screen display to a library of touch templates. If a touch pattern more closely resembles a circle template than a spiral template, for example, then the processor returns "spiral". In general, the processor returns the template (and concomitant control command from the library above) that the touch gesture sensed by the touch screen most closely matches. When the command is for a device (such as the disk player) sending AV to the TV the TV processor passes the command to the device.

Figure 4:
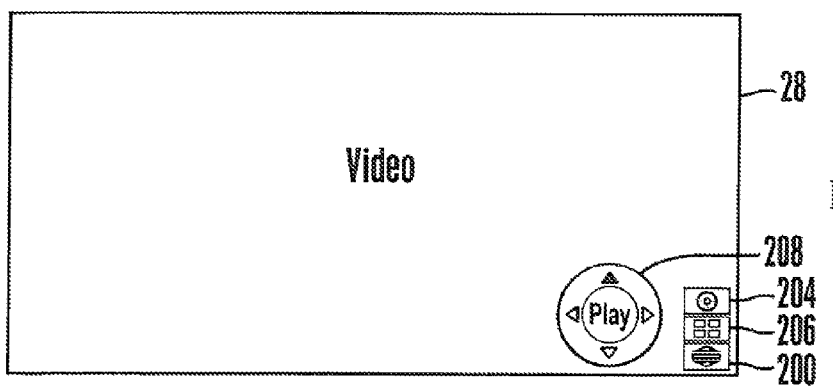

By touching an "icon" element 200 on an onscreen GUI (FIG. 2) or by making any touch on the screen, the user can signal to the processor that touch commands are now to be invoked, and the main, GUI 201 can be hidden from view except for the three toggle icon display 202 of FIG. 3. By touching a "full" icon 204 (FIG. 3) the entire GUI can be made to reappear as shown in FIG. 2, with touch commands disabled and GUI-initiated commands invoked. By touching a direction pad icon 206, only the three toggle icon display 202 and a four-way direction pad 208 (FIG. 4) can be made to appear, with the main GUI shown in FIG. 2 removed and with touch gesture control enabled. The arrows on the pad 208 can be touched to move a screen cursor in the directions indicated by the arrows.

Recognizing that several different touches are used to execute various functions that make up the TV and disk player user experience(s), present principles provide for training the user on which touches accomplish which features. In one example, on screen animations of a human hand making the various touch gestures are overlaid onto the video being presented on the display that depict respective gestures in relation to their respective function. Thus, the animated hand (FIG. 5) moves (as shown in temporal sequence in FIG. 6) on screen through the corresponding gesture, e.g., through a linear swipe or circle or spiral motion. In FIG. 6 and using the circle gesture as an example, the animation begins at 300 and then moves in continuous temporal sequence as indicated by the arrow 301 through 302, 304, 306, and 308 to form a circular trace, it being understood that only a single hand image is shown at a time and that the positions 300-308 are temporally spaced images of the same animated hand.

The animations may appear when a corresponding GUI button or RC function has been invoked. For example, while watching a video on a touch interface if there is a GUI button that executes "rewind", when REW is pressed either using the GUI or a hardware key on the RC an animation appears (in, e.g., the upper right corner of the display 28) depicting the appropriate gesture for REW. Hand animations illustrating each of the above-discussed gestures can be presented on screen when the respective soft key for the same function is selected.

The user may be given the option of turning animations on and off by toggling a GUI button that has on and off states. Voice commands may also be implemented for inputting the above-discussed commands.

Figure 7:
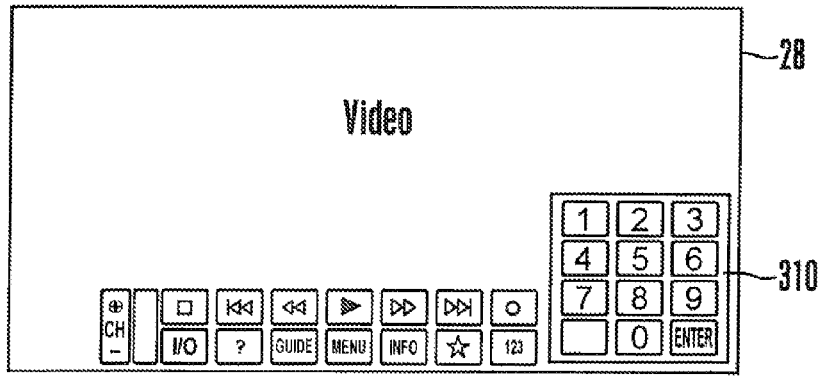

FIG. 7 shows that a soft number pad 310 can be presented on the display 28 to allow a viewer to select any number from zero to nine to input for, e.g., tuning to a specific channel number.

FIGS. 8-10 show a sequence of screen shots that can be presented on the display 28. From a normal video presentation in FIG. 8, a viewer can touch the display 28 with four fingers, or select a "search" button on the RC 30 or a corresponding "search" soft key presented on the display 28, to invoke the screen shot of FIG. 9. In FIG. 9, a soft keyboard 312 which in the embodiment shown is a full QWERTY keyboard can be presented and its keys selected by touch or by using the RC 30 to input a keyword into the text box 314 as shown in FIG. 10. An Internet search for the keyword may then be executed by the TV 12, or a search of the EPG for the keyword may be executed, or other source may be searched for the keyword. Results are presented on the display 28.

FIGS. 11 and 12 illustrate that while in full screen video display mode (FIG. 11), a viewer can "drag" the edge of the display by, e.g., placing multiple fingers on the display and moving his or her fingers toward the edge of the display to cause the split screen shown in FIG. 12 to appear. In the split screen, the video formerly presented in the full screen mode of FIG. 11 is presented in a video window 316 in FIG. 12. A description window 318 may be juxtaposed with the video window 316 and may present informational text pertaining to the video in the window 316 as derived from metadata received with the video. A browser window 320 may also appear with the windows 316, 318 and can present Internet-sourced information pertaining to the video in the video window 316.

FIG. 13 shows example overall logic in accordance with present principles. Commencing at decision diamond 320, if the TV processor determines that touch gesture control is not enabled, the logic flows to block 322 to receive input commands from the RC 30 and/or from the soft button GUI shown in FIG. 2. On the other hand, when touch gesture control is enabled, the logic flows to block 324 to receive, via the touch screen display 28, one of the above-described tactile gestures, determining which gesture has been received at block 326 using, e.g., the above-described template method. Other methods may be used without limitation. At block 328 the TV correlates the sensed gesture with the corresponding command and implements the command on the TV (for, e.g., channel up/down) or the source of video (for, e.g., pause, play, fast forward, etc.) In the latter case, when the TV processor determines the gesture corresponds to a command that requires execution by a component communicating with the TV, the TV processor sends the command to the component for execution.

While the particular TRAINING FOR SUBSTITUTING TOUCH GESTURES FOR GUI OR HARDWARE KEYS TO CONTROL AUDIO VIDEO PLAY is herein shown and described in detail, it is to be understood that the subject matter which is encompassed by the present invention is limited only by the claims.

What is claimed is:

1. Method for training a user on which touches on a touch screen display of an audio video (AV) device accomplish which respective commands, comprising:
    presenting video on the AV device play of which is controllable by at least a first and second graphical user interface (GUI) elements presented on the AV device and/or by at least first and second keys on a wireless remote control device (RC), selection of the first GUI element and/or first key on the RC causing a respective first video control function, selection of the second GUI element and/or second key on the RC causing a respective second video control function;
    responsive to user selection of the first GUI element and/or the first key on the wireless RC, presenting on screen animation of a human hand on the AV device making a first touch gesture, the function of the first gesture being the first video control function as the corresponding first GUI element and/or first RC key;
    responsive to user selection of the second GUI element and/or the second key on the wireless RC, presenting on screen animation of a human hand on the AV device making a second touch gesture, the function of the second gesture being the second video control function as the corresponding second GUI element and/or second RC key;
    overlaying an animation of the human hand presented responsive to selection of a GUI element and/or key on the RC onto the video being presented on the AV device and being controlled by the GUI elements and/or RC.

2. The method of claim 1, wherein responsive to a user selecting a rewind button from an onscreen GUI on the AV device an animated hand appears on the AV device and moves through a touch gesture corresponding to rewind.

3. The method of claim 1, wherein a user can select to turn off animations of touch gestures being presented on the AV device by toggling a GUI element or RC key.

4. The method of claim 1, wherein the gesture is a circle.

5. The method of claim 1, wherein the gesture is a spiral.

6. The method of claim 1, wherein the gesture is a stationary press.

7. The method of claim 1, wherein the gesture is at least one linear swipe across at least a portion of the screen.

8. The method of claim 7, wherein the swipe is vertical on the screen.

9. The method of claim 7, wherein the swipe is horizontal on the screen.

10. A non-transitory computer readable storage medium bearing instructions executable by a digital processor to configure the processor to:
    present video on a display of an audio video (AV) device, play of which video is controllable by at least a first and second graphical user interface (GUI) elements presented on the AV device and/or by at least first and second keys on a wireless remote control device (RC), selection of the first GUI element and/or first key on the RC causing a respective first video control function, selection of the second GUI element and/or second key on the RC causing a respective second video control function;

responsive to user selection of the first GUI element and/or the first key on the wireless RC, present on screen animation of a human hand on the display making a first gesture, the function of the first gesture being the first video control function as the corresponding first GUI element and/or first RC key;

responsive to user selection of the second GUI element and/or the second key on the wireless RC, present on screen animation of a human hand on the display making a second gesture, the function of the second gesture being the second video control function as the corresponding second GUI element and/or second RC key;

overlay an animation of the human hand presented responsive to selection of a GUI element and/or key on the RC onto the video being presented on the display and being controlled by the GUI elements and/or RC.

11. The non-transitory computer readable storage medium of claim 10, wherein the instructions when executed by the processor configure the processor to, responsive to a user selecting a rewind button from an onscreen GUI on the display, present an animated hand on the display moving through a touch gesture corresponding to rewind.

12. The non-transitory computer readable storage medium of claim 10, wherein the instructions when executed by the processor configure the processor to turn off animations of gestures being presented on the display responsive to selection of a predetermined GUI element or RC key.

13. The non-transitory computer readable storage medium of claim 10, wherein one of the gestures is a circle.

14. The non-transitory computer readable storage medium of claim 10, wherein one of the gestures is a spiral.

15. The non-transitory computer readable storage medium of claim 10, wherein one of the gestures is a stationary press.

16. The non-transitory computer readable storage medium of claim 10, wherein one of the gestures is at least one linear swipe across at least a portion of the screen.

* * * * *